United States Patent

Engelhard

[11] Patent Number: 5,709,799
[45] Date of Patent: Jan. 20, 1998

[54] SUPER OZONATING WATER PURIFIER

[75] Inventor: Rolf Engelhard, Prescott, Ariz.

[73] Assignee: Vortex Corporation, Prescott, Ariz.

[21] Appl. No.: 660,194

[22] Filed: Jun. 3, 1996

[51] Int. Cl.⁶ .................. C02F 1/32; C02F 1/78
[52] U.S. Cl. .............. 210/748; 210/760; 210/192; 250/436; 250/437
[58] Field of Search .................. 210/760, 192, 210/748; 250/435, 436, 437, 438, 432 R; 422/24

[56] References Cited

U.S. PATENT DOCUMENTS

| | | | |
|---|---|---|---|
| 2,970,821 | 2/1961 | Axt | 210/760 |
| 3,336,099 | 8/1967 | Czulak et al. | 210/760 |
| 3,550,782 | 12/1970 | Veloz | 210/192 |
| 3,696,932 | 10/1972 | Rosenberg | 210/437 |
| 3,726,404 | 4/1973 | Troglione | 210/139 |
| 4,069,153 | 1/1978 | Gunther | 210/64 |
| 4,141,830 | 2/1979 | Last | 210/192 |
| 4,156,652 | 5/1979 | Wiest | 250/527 |
| 4,176,061 | 11/1979 | Stopka | 210/760 |
| 4,179,616 | 12/1979 | Coviello et al. | 250/527 |
| 4,230,571 | 10/1980 | Dadd | 210/760 |
| 4,273,660 | 6/1981 | Beitzel | 210/760 |
| 4,274,970 | 6/1981 | Beitzel | 210/760 |
| 4,437,999 | 3/1984 | Mayne | 210/748 |
| 4,694,179 | 9/1987 | Lew et al. | 250/431 |
| 4,857,204 | 8/1989 | Joklik | 210/695 |
| 4,892,712 | 1/1990 | Robertson et al. | 422/186 |
| 4,913,827 | 4/1990 | Nebel | 210/748 |
| 4,968,437 | 11/1990 | Noll et al. | 210/748 |
| 5,106,495 | 4/1992 | Hughes | 210/139 |
| 5,106,501 | 4/1992 | Yang et al. | 210/266 |
| 5,120,450 | 6/1992 | Stanley, Jr. | 210/748 |
| 5,141,636 | 8/1992 | Flanagan et al. | 210/209 |
| 5,178,755 | 1/1993 | LaCrosse | 210/195.1 |
| 5,178,758 | 1/1993 | Hwang | 210/256 |
| 5,180,499 | 1/1993 | Hinson et al. | 210/706 |
| 5,213,773 | 5/1993 | Burris | 422/256 |
| 5,266,215 | 11/1993 | Engelhard | 210/748 |
| 5,268,104 | 12/1993 | Massoomain | 210/638 |
| 5,302,298 | 4/1994 | Leitzke | 210/748 |
| 5,505,856 | 4/1996 | Campen et al. | 210/760 |
| 5,540,848 | 7/1996 | Engelhard | 210/760 |
| 5,547,590 | 8/1996 | Szabo | 210/760 |

*Primary Examiner*—Cynthia L. Nessler
*Attorney, Agent, or Firm*—Cahill, Sutton & Thomas P.L.C.

[57] ABSTRACT

Water to be purified is directed into a first tank and is entrained with ozone. The ozonated water is channeled into a second tank and is exposed to ultraviolet radiation. An ultraviolet radiating lamp produces the ultraviolet radiation and also is exposed to a source of air for generating ozone. The generated ozone is conveyed to and entrained in the water in the first tank. A filter may be used to filter the water flowing into the first tank. A discharge conduit conveys the ozonated, irradiated and purified water to a point of use.

27 Claims, 2 Drawing Sheets

SUPER OZONATING WATER PURIFIER

BACKGROUND OF THE INVENTION

1. Field of the Invention

The present invention relates to water purification systems and, more particularly, to apparatus for destroying bacteria, viruses, and other microorganisms that may be present in water for potable purposes.

2. Description of Related Art

For decades, various water filtering and purifying devices have been available for home use. Some of these devices perform primarily only a filtering function to remove particulate matter and marginally, if at all, filter out harmful microorganisms unless the filter is extremely fine. Activated charcoal has been used as a filtering medium to remove chlorine from water obtained from municipal water sources. Some devices incorporate a source of ultraviolet light to help kill microorganisms. Other devices inject ozone into the water to enhance the killing of microorganisms and to oxidize various compounds that may be present in the water.

A major drawback attendant the use of filters results from the collection on the upstream side of contaminants and sludge. The sludge serves as a breeding ground for bacteria, viruses, and other microorganisms. Depending upon the fineness of the mesh of the filter, certain of these microorganisms are conveyed downstream of the filter and are ultimately ingested by the consumer. Moreover, any damage or non-uniformity of the filter will accommodate passthrough of microorganisms. The resulting potential health hazard can be avoided to some extent by regular replacement of the filtering medium. Unfortunately, any microorganisms already present downstream may continue to breed. Furthermore, filter replacement is often neglected. For these reasons, the use of mechanical filters has been banned in various communities around the world.

SUMMARY OF THE INVENTION

Ozone is entrained in the water in a cistern or a first water tank. The ozone entrained water is conveyed, on demand, through a second tank and subjected to the microorganism killing effect of ultraviolet radiation. The ozonated and irradiated water is discharged for use on demand. In addition to irradiating the water, the ultraviolet radiation generates within a housing the ozone that is conveyed to and entrained in the water in the first tank.

It is therefore a primary object of the present invention to provide a two tank water purification system for ozonating the water and irradiating the water with ultraviolet light.

Another object of the present invention is to purify water present in existing cisterns prior to consumption.

Still another object of the present invention is to provide apparatus for irradiating with ultraviolet light ozonated water at the time of demand for the water.

Yet another object of the present invention is to provide apparatus for generating ozone to ozonate water recirculated through a first tank and for irradiating the ozonated water in a second tank as a function of demand for the water.

A further object of the present invention is to provide apparatus for ozonating water in a first tank, conveying the ozonated water to a second tank, irradiating the water in the second tank with ultraviolet light, generating ozone within a housing in the second tank as a function of the ultraviolet light radiation, and entraining the generated ozone in the water in the first tank.

A yet further object of the present invention is to provide water purifying apparatus for use in existing cisterns and water tanks.

A yet further object of the present invention is to provide a method for purifying water by serially ozonating and irradiating the water in different tanks.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which.

DETAILED DESCRIPTION OF THE PREFERRED EMBODIMENT

Figure 1:
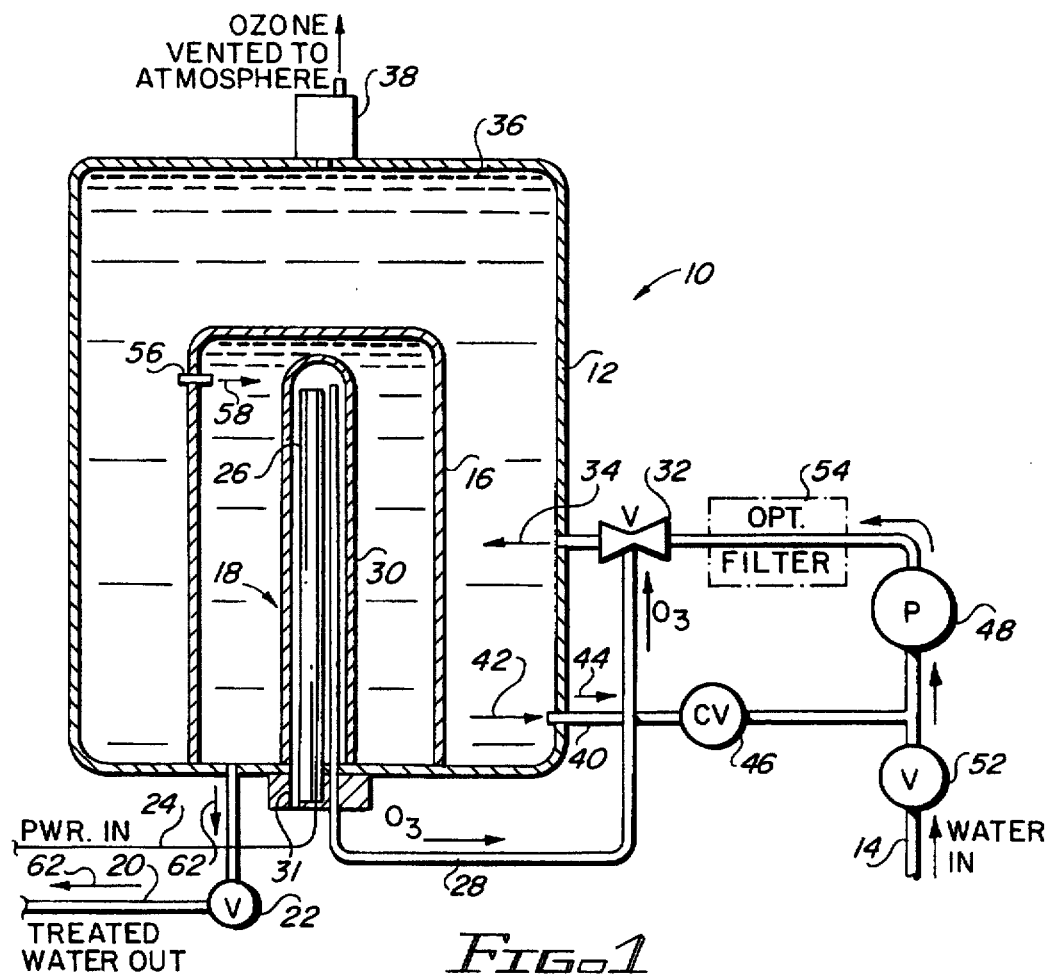
FIG. 1 is a cross-sectional view of the operative elements of the present invention.

Referring to FIG. 1, there is illustrated a water purification apparatus 10 for purifying water from any of several sources, such as a municipal water system, a well, a rain catchment, a stream, or a river. The water to be purified is contained in a cistern or first water tank 12 and brought thereinto through an inlet conduit 14 or the like. While FIG. 1 illustrates the first water tank as being a closed container, it may have an open or openable top and may receive the inflowing water through such opening. A compartment or second tank 16, which may be disposed within the first tank 12, includes an ozone generator 18. The treated water is discharged from the second tank through a discharge conduit 20 or the like via a valve 22. A set of conductors 24 provides power to ultraviolet lamp 26 disposed within ozone generator 18. A tube 28 extends from within the upper end of a quartz housing 30 of the ozone generator to accommodate outflow of ozone produced by the reaction of the ultraviolet radiation with the air present within the quartz housing. To provide a continual source of air to produce ozone, the ozone generator may be vented to the atmosphere through vent 31. That is, the low pressure created within quartz housing 30 due to outflow of ozone therefrom will tend to draw ambient air through passageway 31 into the quartz housing. Tube 28 conveys the ozone to a venturi 32 in line with inlet conduit 14. In accordance with the Bernoulli Principle, a low pressure environment is created within the throat of venturi 32 to draw in the ozone in the form of bubbles which will become entrained in the water flowing through inlet conduit 14. The ozone entrained water will enter first tank 12, as represented by arrow 34. Thus, the water within the first tank will be ozonated water.

The ozone in the ozonated water within first tank 12 will tend to migrate upwardly and collect at the top of the first tank. If the top of the first tank is open or has an opening, the ozone will escape into the ambient atmosphere. If the top of the tank is closed, as depicted in FIG. 1, the ozone will collect at the top of the tank, as represented by space 36. A vent 38, which may include an ozone destructor to convert the ozone to oxygen and prevent ozone discharge, may be included.

Because the ozone tends not to remain entrained in the water within first tank 12, it is necessary to periodically or continually re-entrain ozone in the water. A recirculating conduit 40 receives an inflow of water from first tank 12, as represented by arrow 42. The water flowing through the recirculating conduit, as depicted by arrow 44, passes through a check valve 46 into inlet conduit 14. To maintain circulation from the recirculating conduit into the inlet conduit, a pump 48 may be incorporated. Upon operation of the pump, the water within first tank 12 is continually or periodically recirculated through venturi 32 and the recirculating water becomes continually or periodically entrained with ozone. In this manner, the water within first tank 12 is maintained ozonated to a level commensurate with a set of parameters.

Figure 2:
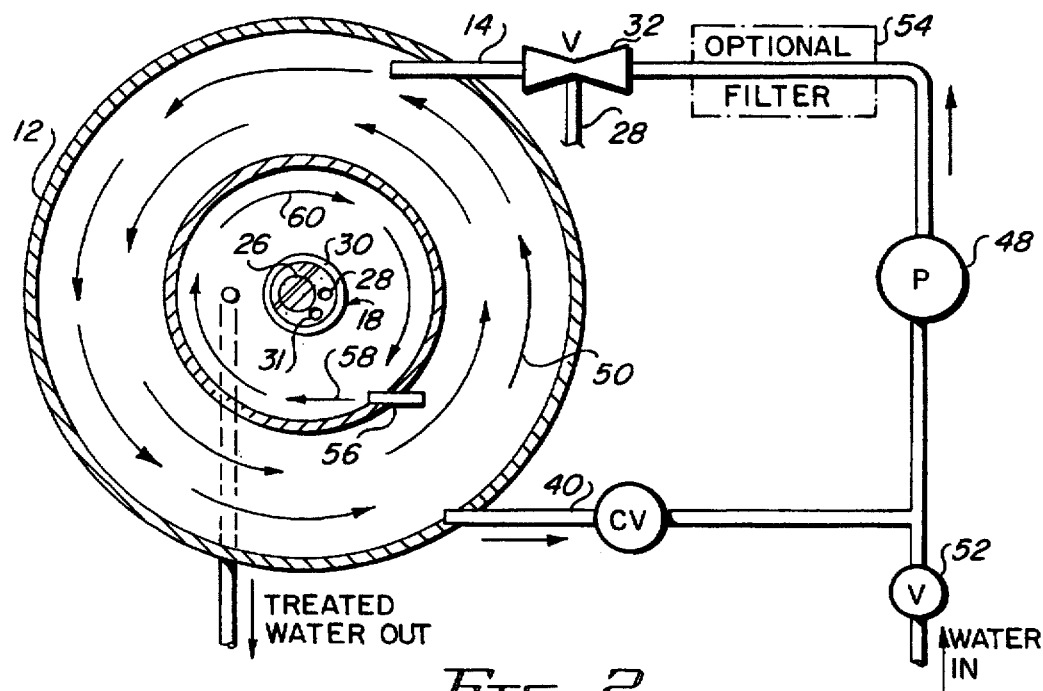
FIG. 2 illustrates the induced water circulation of the apparatus shown in FIG. 1 to bring about effective ozone entrainment and irradiation of the water.

Referring jointly to FIGS. 1 and 2, further features of the invention will be described. To maintain an essentially uniform distribution of ozonated water within tank 12, inlet conduit 14 discharges the ozonated water into first tank 12 at an angle with respect to the configuration of the first tank to induce turbulent and/or circulating flow within the tank, as depicted by arrows 50. The resulting mixing of introduced ozonated water with the existing water will tend to maintain the level of ozone entrainment close to uniform throughout the tank. If the angle or orientation of the water receiving recirculating conduit 14 is selected, as depicted, to enhance the turbulation/circular flow within first tank 12, the process of water outflow for re-entrainment purposes will aid in maintaining uniformity of entrained water within the first tank. The flow of new or replacement water into the first tank may be controlled by a valve 52. Depending upon the degree and type of particulate matter that may be present in the water introduced, an optional filter 54 may be incorporated upstream of venturi 32.

The ozonated water within first tank 12 is introduced into second tank 16 through a passageway 56, as depicted by arrow 58. Preferably, the water within the second tank is turbulated to enhance exposure to irradiation from ultraviolet lamp 26 of ozone generator 18. Such turbulation can be provided by orienting passageway 56 at an angle to encourage circular flow about the ozone generator, as depicted by arrows 60. The turbulent flow of the water within the second tank will continually expose all of the water to irradiation. The ozonated and irradiated water is discharged from within second tank 16 through discharge conduit 20 upon appropriate manipulation of valve 22, as depicted by arrows 62.

Figure 5:
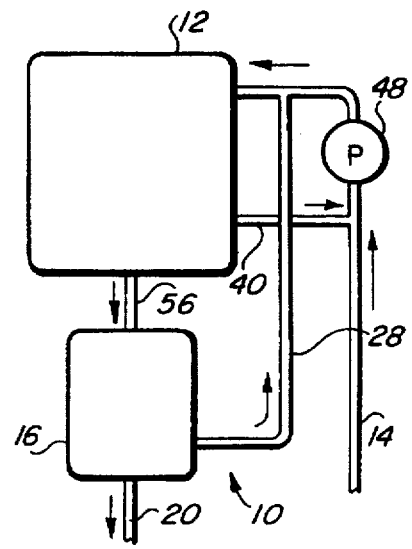
FIG. 5 illustrates a representative flow diagram of the apparatus shown in FIG. 1.

Referring specifically to FIG. 5, there is shown a simplified configuration of the embodiment of the invention shown in detail in FIGS. 1 and 2. The water to be purified is introduced through inlet conduit 14 into first tank 12. Outflow of water from the first tank into second tank 16 occurs through passageway 56. The second tank includes an ozone generator and the ozone output of the ozone generator is conveyed through tube 28 to a venturi or other mechanism for entraining ozone within the water flowing into first tank 12. The ozone performs the function of destroying microorganisms that may be present in the water. Furthermore, it performs an oxidizing function with respect to certain other matter that may be present in the water.

The ozone generator within second tank 16 generates the ozone through ultraviolet irradiation of the air within a housing. The ozonated water within second tank 16 is irradiated by the ultraviolet lamp of the ozone generator to perform a further killing function of any microorganisms that may be present. The resulting purified water is discharged on demand through discharge conduit 20. It may be noted, that the second tank may be located within the first tank, as depicted in FIG. 1, or the two tanks may be separate from one another, as depicted in FIG. 5. The latter configuration is particularly useful where an existing cistern or water tank is to be modified to incorporate the benefits of the present invention. That is, such existing water tank need only be modified to accommodate entrainment of ozone and preferably also recirculation of water within the tank to maintain a sufficient uniform level of entrained ozone. An existing discharge conduit may be used to convey water to the second tank, which second tank may be located in proximity to or significantly apart from the existing cistern or water tank. Thus, the plumbing modifications to add second tank 16 and the attendant conduits is minimal and readily accomplishable in the field. This permits conversion of water tanks at remote locations to provide purified water that is not otherwise available.

Figure 3:
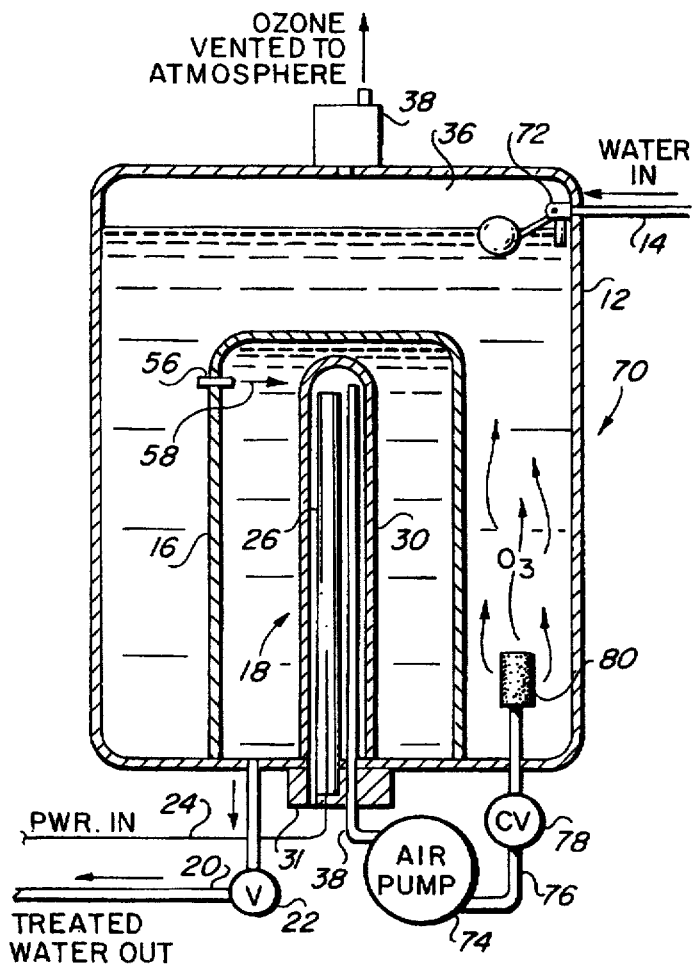
FIG. 3 is a partial cross-sectional view of a variant of the present invention.
Figure 4:
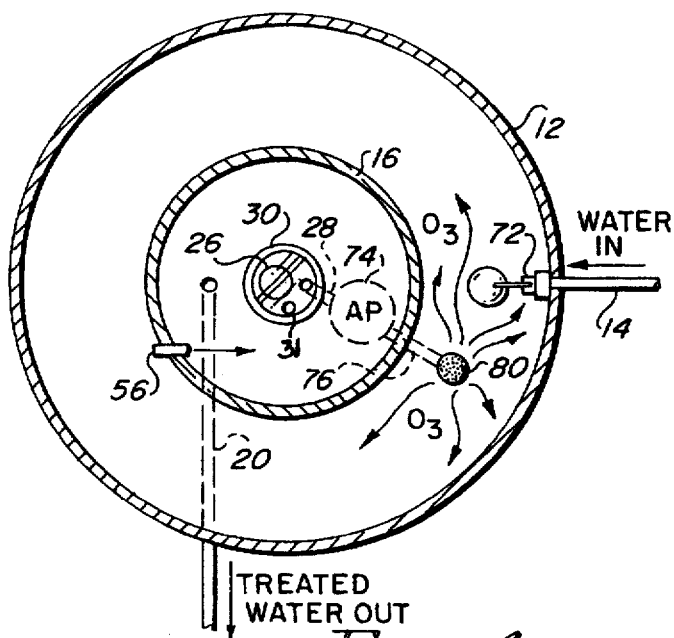
FIG. 4 illustrates certain features of the apparatus shown in FIG. 3.

Referring jointly to FIGS. 3 and 4, a variant 70 of the water purification apparatus will be described. For the sake of convenience and greater understanding of the invention, the elements of the variant 70 common with the elements of water purification apparatus 10 have been assigned the same reference numerals. Water from a source of water is introduced to a cistern or first tank 12 through inlet conduit 14. The inflow of water may be regulated or controlled by a float valve 72 or other flow regulating mechanism. A second tank 16 may be located within the first tank and it houses an ozone generator 18. Outflow of purified water occurs through discharge conduit 20 and flow therethrough may be regulated by a valve 22. Power for ozone generator 18 is provided by a set of conductors 24. The ozone generator includes an ultraviolet lamp 26 and a tube 28 disposed within a quartz housing 30. A vent 31 provides fluid communication between the interior of housing 30 and the ambient atmosphere to permit an inflow of air to the housing. Tube 28 extends from the upper end of housing 30 exteriorly of the housing to an air pump 74. The air pump draws ozone from within housing 30 and forces it through tube extension 76 via a check valve 78 to a sparger 80 disposed within first tank 12. The sparger emits a multitude of very small bubbles of ozone, which bubbles become entrained with the water within tank 12. Thereby, this water becomes ozonated.

If tank 12 is open at the top or has an opening, the ozone migrating upwardly through the water will ultimately become mixed with the ambient atmosphere. Should first tank 12 be closed, as depicted in FIG. 3, a vent 38 may be provided to accommodate outflow of ozone from space 36 above the water level within the first tank. The vent may include an ozone destructor for converting the ozone to oxygen and thereby prevent introduction of ozone molecules into the atmosphere.

The ozonated water within first tank 12 will flow into second tank 16 through passageway 56, as depicted by arrow 58. The ozonated water within the second tank is irradiated by ultraviolet light 26 to kill any microorganisms that may be present. If passageway 56 is angled with respect to second tank 16, as depicted in FIG. 4, the inflowing water will tend to swirl and circulate about ozone generator 18. Such circulation will tend to continually expose all of the water relatively uniformly to irradiation from the ultraviolet lamp. Thereby, the water is essentially continually and completely exposed to ultraviolet irradiation with a commensurate degree of effectiveness in destroying living microorganisms. On demand, ozonated and irradiated water will flow through valve 22 and be discharged through discharge conduit 20.

As depicted in FIG. 4, the inflowing water is directed essentially toward the center of first tank 12. Such water flow orientation will necessarily result in turbulation of the existing water. Further turbulation, to cause continuing mixing of the water to ensure an essentially uniform concentration of ozone entrainment, can be enhanced by use of baffles or other water channeling members. Furthermore, a plurality of water inlets may be employed or one or more inlets may be angularly oriented to encourage further and more robust circulation. Moreover, the ozone discharge in the form of tiny bubbles from sparger 80 will result in upward migration of the ozone bubbles. Such migration will cause vertical water flow within the first tank to bring less ozonated water into proximity of sparger 80. Thereby, the ozone entrainment level will remain essentially uniform throughout the first tank.

Figure 6:
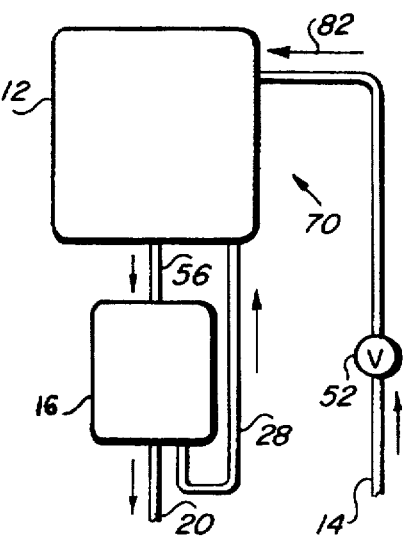
FIG. 6 is a representative flow diagram of the apparatus shown in FIG. 3.

Referring specifically to FIG. 6, there is illustrated a simplified drawing of variant 70 shown in FIGS. 3 and 4. Water to be purified enters first tank 12, as indicated by arrow 82, through inlet conduit 14 via valve 52. The ozone entrained water (ozonated water) in first tank 12 flows through passageway 56 into second tank 16. An ozone generator disposed within the second tank irradiates the water therein and also produces ozone. The ozone is conveyed through tube 28 into first tank 12 and entrained in the water therein to produce ozonated water. The ozonated and irradiated water is discharged through discharge conduit 20 for use as potable water on demand. As it is not necessary to have the second tank lodged within the first tank, as shown in FIGS. 3 and 4, they may be separated, as shown in FIG. 6. With such separation, it is possible to embody the present invention in and with existing cisterns, water tanks, and the like to provide purified water. Furthermore, it is possible to embody the present invention at remote locations where existing cisterns, water tanks, etc. may be located provided only that a source of power is available to operate the ozone generator and any attendant water or air pumps that may be required to convey the ozone and/or water.

While the invention has been described with reference to several particular embodiments thereof, those skilled in the art will be able to make the various modifications to the described embodiments of the invention without departing from the true spirit and scope of the invention. It is intended that all combinations of elements and steps which perform substantially the same function in substantially the same way to achieve the same result are within the scope of the invention.

What is claimed is:

1. A method for purifying water, said method comprising in combination:
    (a) directing water to be purified into a first tank;
    (b) entraining ozone in the water to be purified;
    (c) conveying ozonated water from the first tank into a second tank disposed within the first tank;
    (d) irradiating the ozonated water in the second tank with ultraviolet radiation; and
    (e) discharging the ozonated and irradiated water from the second tank.

2. The method as set forth in claim 1 wherein said step of irradiating is carried out within the confines of the first tank.

3. The method as set forth in claim 1 wherein said step of irradiating includes the step of generating the ozone to be entrained in the water.

4. The method as set forth in claim 3 wherein said steps of irradiating and generating are carried out within the confines of the first tank.

5. The method as set forth in claim 3 including the step of turbulating the water flowing into the second tank to expose all of the water to ultraviolet radiation.

6. The method as set forth in claim 3 including the step of homogenizing the entrained ozone within the first tank.

7. The method as set forth in claim 6 including the step of filtering the water directed into the first tank.

8. A water purification apparatus comprising in combination:
    (a) a first tank for receiving water to be purified from a source;
    (b) an ozone entraining means fluidly connected with said first tank for entraining ozone in the water to be purified;
    (c) a second tank disposed within said first tank and connected to said first tank for receiving ozonated water from said first tank;
    (d) a source of ultraviolet radiation disposed within said second tank for irradiating the water within said second tank; and
    (e) a conduit connected to said second tank for discharging the purified water from said second tank.

9. The apparatus as set forth in claim 8 including a further conduit interconnecting said first and second tanks for directing water from said first tank to flow about said source of ultraviolet radiation and expose the water received in said second tank to irradiation by said source of ultraviolet radiation.

10. The apparatus as set forth in claim 8 including a water inlet connected to said first tank for directing circulation within said first tank of the water received therein to homogenize the entrained ozone.

11. The apparatus as set forth in claim 8 including a flow control apparatus for controlling the flow of water from the source and into said first tank.

12. The apparatus as set forth in claim 8 including a vent connected to said first tank for venting ozone from said first tank.

13. The apparatus as set forth in claim 8 including a filter upstream from said water inlet for filtering the water received in said first tank.

14. The apparatus as set forth in claim 8 wherein said ozone entraining means comprises a sparger disposed in said first tank, said sparger being in fluid communication with said source of ultraviolet radiation.

15. The apparatus as set forth in claim 14 including an air pump disposed intermediate said source of ultraviolet radiation and said sparger for pumping ozone from said source of ultraviolet radiation to said sparger.

16. The apparatus as set forth in claim 14 including a passageway disposed in said second tank and correcting said second tank to said first tank for directing water flow into said second tank from said first tank and for urging a water flow path about said quartz housing.

17. The apparatus as set forth in claim 8 wherein said source of ultraviolet radiation comprises an ozone generator disposed within said second tank.

18. The apparatus as set forth in claim 17 including a further conduit interconnecting said first and second tanks for directing water from said first tank to flow about said source of ultraviolet radiation and expose the water received in said second tank to irradiation by said source of ultraviolet radiation.

19. The apparatus as set forth in claim 18 including a water inlet connected to said first tank for directing circulation within said first tank of the water received therein to homogenize the entrained ozone.

20. The apparatus as set forth in claim 17 wherein said ozone generator comprises a lamp disposed at least in part in said second tank for radiating ultraviolet light, a quartz housing disposed at least in part in said second tank for housing said lamp and a tube having an inlet within said quartz housing for receiving ozone generated within said quartz housing by said lamp and an outlet in fluid communication with said entraining device for delivering ozone to said entraining device.

21. The apparatus as set forth in claim 20 including a passageway disposed in said second tank and connecting said second tank to said first tank for directing water flow into said second tank from said first tank and for urging a water flow path about said quartz housing.

22. The apparatus as set forth in claim 17 wherein said ozone generator comprises a lamp for radiating ultraviolet light, a quartz housing disposed at least in part in said second tank for housing said lamp and a tube having an inlet within said quartz housing for receiving ozone generated within said quartz housing by said lamp.

23. The apparatus as set forth in claim 22 including a passageway disposed in said second tank and connecting said second tank to said first tank for directing water flow into said second tank from said first tank and for urging a water flow path about said quartz housing.

24. The apparatus as set forth in claim 22 wherein said ozone entraining means comprises a venturi in fluid communication with said tube and the source of water.

25. The apparatus as set forth in claim 24 including a pump connected to said first tank for circulating water into and out of said first tank.

26. The apparatus as set forth in claim 25 including at least one flow directing device disposed in said first tank for turbulating the water in said first tank as a function of the pumped circulating water.

27. The apparatus as set forth in claim 26 including an outlet disposed in said second tank and connecting said second tank to said first tank for directing water flow into said second tank from said first tank and for urging a water flow path about said quartz housing.

* * * * *